Oct. 8, 1957

G. C. WEDGEWORTH 2,808,665

GROUND CLEARING TRACTOR ATTACHMENT

Filed March 28, 1955

George C. Wedgeworth
INVENTOR.

BY

United States Patent Office 2,808,665
Patented Oct. 8, 1957

2,808,665

GROUND CLEARING TRACTOR ATTACHMENT

George C. Wedgeworth, Coker, Ala.

Application March 28, 1955, Serial No. 497,199

2 Claims. (Cl. 37—2)

The present invention relates to novel structural means which may be classified, generally speaking, as added equipment for either a Ford or Ferguson tractor to permit the operator thereof to attend to miscellaneous work requirements having to do with ground clearing, for example, digging, loosening, lifting and removing stumps, embedded heavy stones, small trees, bushes and the like.

More specifically classified the equipment, in an overall structural sense, falls in the broad category of tractor attachment means, the latter being characterized by a rigid lever-like end thrust bar having suitable tool means on its rear working end, the forward end being hingedly attached to an adapter bracket which is bolted to a stock part of the rear end construction of the tractor, the intermediate portion of said bar being saddled appropriately in a stirrup-like hanger or clevis which is detachably and adjustably bolted to a cooperating cross bar forming a part of the more or less standard power lift yoke or frame carried by the rear end construction of the stated tractor.

Another object of the invention is to dispense with the usual rigid links which afford a lifting and operating connection between the customary power lift arms on the tractor and the arms of the aforementioned power lifting frame and to provide, in lieu thereof, flexible cables, pulleys and an adapter rod all cooperatively functioning to increase the range of movement of the frame and to thus proportionately increase the range of usefulness of the end thrust bar.

The specific structural characteristics and cooperating details and other objects, features and advantages of the over-all invention will doubtless become more readily apparent from the following description and the accompanying sheet of illustrative drawings.

In the drawings, wherein like numerals are employed to designate like parts throughout the views.

Figure 1:
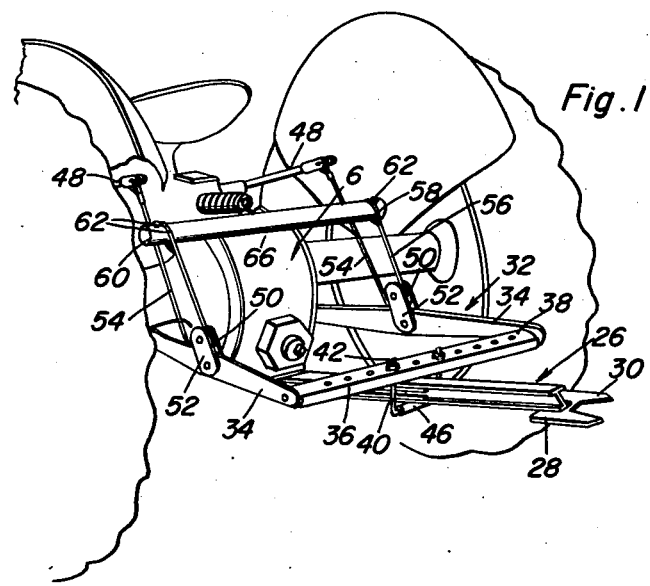
Figure 1 is a fragmentary perspective view illustrating the rear end of a conventional-type tractor showing the improvements, individually and collectively, of the complete inventive concept.

As previously mentioned, the "attachment" means is somewhat composite but provides an over-all desired and improved equipment attachable to the stock parts of a tractor, for example, either a Ford tractor or a Ferguson tractor. The part of the tractor involved is here treated in a rather general manner as the rear end construction and is denoted by the numeral 6 and includes as better shown in Fig. 2 the differential housing 8. Attached to the bottom 10 of this is the simple adapter bracket 12. This is a member which is approximately T-shaped in cross-section and provides a horizontal attaching flange 14 bolted in place at 16 and a reinforcing vertical flange 18. The ears 20 (see Fig. 3) on the forward end serve to accommodate complemental ears 22 which are arranged between the ears 20—20 and bolted and pivoted in place as at 24. These ears 22 are simple lugs which are welded or otherwise connected to the flanges of the forward or inner end portion of the I-beam which is here treated as a lever-like end thrust bar 26. The tool 28 is welded on the rear working end and is forked or otherwise constructed as at 30. This part of the attachment is directly connected with and suspended from what is described as a yoke or U-shaped power lift frame 32 and which is shown in Fig. 1 as the usual side arms 34 mounted on the rear end construction in a generally well known manner and carrying a cross bar 36 at their rear ends which cross bar is provided with selectively usable bolt holes 38 for the attachment of drawbars, and many excavating, digging tools and implements. Here a clevis is provided and denoted generally by the numeral 40 and has its arm portions detachably secured to the bolt holes as at 42 and 44 in Figs. 1 and 2. The bight portion of the clevis has an anti-friction roller 46 and thus a stirrup-like hanger is provided for the intermediate portion of the thrust bar. The thrust bar is passed therethrough and extends rearwardly beyond to position the tool means so that it may be employed for various ground clearing operations such as minor digging jobs, stump removing, or the "bulldozing" removal of trees, stubborn bushes, embedded rocks, and so on.

Figure 4:
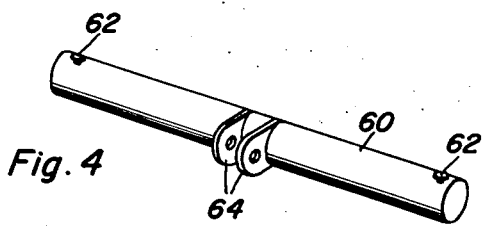
Figure 4 is a perspective view of another adapter member which is treated herein as a cable anchoring adapter rod.

It is also within the purview of the invention to improve the range of lifting and lowering of the frame 32 and this is done by eliminating the usual links (not shown) between the power lift arms 48 and the intermediate portions of the side arms 34. Instead sheaves or pulleys 50 are bracketed thereon as at 52 to accommodate the intermediate portions of the cables. The end portion 54 of the cable is connected at its upper end to intended lift arm 48. The intermediate portion passes over the pulley and then the end portion 56 has a loop at its upper end 58 connected with the adjacent end portion of the adapter rod 60. This rod has retaining pins or the like 62 thereon to assist in holding the looped end portions of the cables in place. The intermediate portion is provided with fixed lugs which constitute attaching ears 64 as shown in Figure 4 and which are hingedly connected to a fixed lug 66 provided therefor on the peripheral portion of the differential housing.

The adapter rod 60 is thus equally and properly suspended intermediate its end from the lug and provides an anchor for the looped ends of the cables. It was found that having a direct link connection between the power arms 48—48 and the arms 34—34 involved a quite limited arcuate range of movement of the over-all U-frame 32. The substitution of the pulley and cable means and adaptable anchor bar has served to increase this lifting action and therefore makes the usefulness of the tool-equipped thrust bar 26 more desirable and therefore aptly intended to serve the intended purposes.

Figure 2:
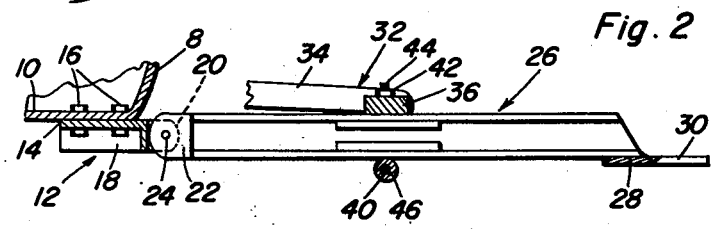
Figure 2 is a fragmentary view in section and elevation showing some of the significant structural details.
Figure 3:
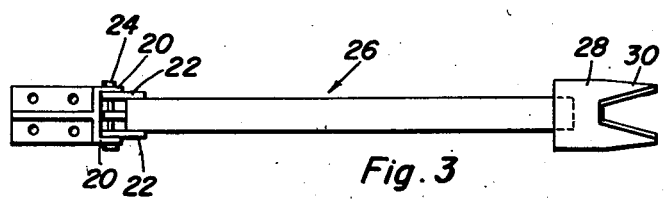
Figure 3 is a detail elevational view of the aforementioned end thrust bar, the adapter bracket and tool on the working end thereof.

Novelty is predicated, as is reasonably obvious, on the combination depicted in Fig. 1, including any suitably supported wheel structure representing the mobile tractor and the subcombination phases thereof; namely, the attachment of Fig. 3, the attachment in conjunction with the frame 32 in Fig. 2 together with the adapter rod 60 and complemental cable and pulley means.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. In combination, a tractor embodying a rear end construction, a lifting frame U-shaped in plan and having rearwardly extending arms pivotally attached to said rear end construction and having, in addition, a crossbar mounted rigidly between the rear liftable and lowerable ends of said arms, a stirrup-like clevis detachably and adjustably mounted on and suspended from and beneath said crossbar, said stirrup-like clevis including a bight portion having an antifriction roller mounted for free rotation thereon, a rigid end thrust bar having an intermediate portion embraced by said clevis and slidingly resting on said antifriction roller, a stump removing tool fixed on the rear end of said bar, and an adapter bracket bolted on said rear end construction, the forward end of said bar being hingedly joined to said bracket by way of a horizontal pivot and being vertically liftable and lowerable.

2. The structure of claim 1 and pulleys mounted on the respective arms of said lifting frame, powered hoisting arms operatively mounted on said rear end construction above said frame, cables having ends connected to their respective arms and intermediate portions trained over their respective pulleys, and an adapted rod having means intermediate its ends hingedly mounted on said rear end construction, said cables having their dead end portions connected with the respective end portions of said rod.

References Cited in the file of this patent

UNITED STATES PATENTS

| | | |
|---|---|---|
| 2,404,926 | Schmacht | July 30, 1946 |
| 2,462,726 | Currie | Feb. 22, 1949 |
| 2,711,036 | Crenshaw | June 21, 1955 |

FOREIGN PATENTS

| | | |
|---|---|---|
| 489,332 | Canada | Jan. 6, 1953 |